United States Patent
Nandal

(10) Patent No.: US 9,237,023 B2
(45) Date of Patent: Jan. 12, 2016

(54) PREPAID DATA HUB

(75) Inventor: Arjun Nandal, Columbia, MD (US)

(73) Assignee: Syniverse Technologies S.à.r.l, Luxembourg ( * ) Notice: Subject to any disclaimer, the term of this patent is extended or adjusted under 35 U.S.C. 154(b) by 0 days.

(21) Appl. No.: 13/208,474

(22) Filed: Aug. 12, 2011

(65) Prior Publication Data

US 2012/0064856 A1 Mar. 15, 2012

Related U.S. Application Data

(60) Provisional application No. 61/373,087, filed on Aug. 12, 2010, provisional application No. 61/373,512, filed on Aug. 13, 2010.

(51) Int. Cl.
*H04M 11/00* (2006.01)
*H04L 12/14* (2006.01)

(52) U.S. Cl.
CPC ........ *H04L 12/1467* (2013.01); *H04L 12/1417* (2013.01)

(58) Field of Classification Search
CPC ....... H04W 4/24; H04W 12/06; H04W 60/00; H04W 8/12; H04W 8/02; H04W 72/04; H04W 76/007; H04W 88/06; H04W 40/20; H04W 4/02; H04W 8/22; H04W 40/36; H04W 48/18; H04W 88/02; H04W 8/04; H04W 8/06; H04M 2215/208; H04M 15/64; H04M 15/65; H04M 15/772; H04M 15/82; H04M 15/8214; H04M 15/851; H04M 15/852; H04M 15/866; H04M 2215/44; H04M 2215/8158; H04M 2215/8195; H04M 7/1235; H04M 7/1245
USPC ........................ 455/405, 406, 407, 408, 414.1
See application file for complete search history.

(56) References Cited

U.S. PATENT DOCUMENTS

| | | | |
|---|---|---|---|
| 7,428,414 B2 | 9/2008 | Kumar et al. | |
| 2002/0174212 A1* | 11/2002 | Casati et al. | 709/223 |
| 2004/0018829 A1* | 1/2004 | Raman et al. | 455/406 |

FOREIGN PATENT DOCUMENTS

| | | |
|---|---|---|
| EP | 1 223 737 | 7/2002 |
| WO | WO 00/24161 | 4/2000 |

(Continued)

OTHER PUBLICATIONS

Notification Concerning Transmittal of the International Preliminary Report on Patentability (Chapter I of the Patent Cooperation Treaty); International Application No. PCT/US2011/047587; Title: Prepaid Data Hub; Date of Mailing: Feb. 21, 2013.

(Continued)

*Primary Examiner* — Nimesh Patel

(74) *Attorney, Agent, or Firm* — Hamilton, Brook, Smith & Reynolds, P.C.

(57) ABSTRACT

A Prepaid Data Hub for maintaining pre-payment information for roaming subscribers. The Hub interacts with two or more wireless telecommunication systems that implement two different wireless protocols and which may be operated by different wireless service providers. The Hub retrieves pre-payment information using two or more different protocols, with a first protocol being native to the home network, but a second protocol being an external prepaid portal protocol. The Hub also monitors subscriber data traffic to limit the amount of access consumed in a subscriber session, notify subscribers of a low balance, and the like. The Hub eliminates the need for network gateway devices to themselves provide control over and/or maintain pre-payment information.

18 Claims, 4 Drawing Sheets

(56) References Cited

FOREIGN PATENT DOCUMENTS

| WO | WO 00/56085 | 9/2000 |
| WO | WO 01/65872 A1 | 9/2001 |
| WO | WO 02/41592 | 5/2002 |
| WO | WO 2005/066858 A1 | 7/2005 |
| WO | WO 2009/101638 A2 | 8/2009 |

OTHER PUBLICATIONS

Notification of Transmittal of the International Search Report and the Written Opinion of the International Searching Authority, or the Declaration; International Application No. PCT/US2011/047587; Date of Mailing: Nov. 23, 2012.

* cited by examiner

PREPAID DATA HUB

RELATED APPLICATION(S)

This application claims the benefit of U.S. Provisional Application No. 61/373,087, filed on Aug. 12, 2010 and U.S. Provisional Application No. 61/373,512, filed on Aug. 13, 2010.

The entire teachings of the above application(s) are incorporated herein by reference.

BACKGROUND

This disclosure relates to wireless networks and devices and more particularly to where some users, operating on a prepaid basis, are allowed to roam beyond their home network to other visited networks.

Growth in the use of personal wireless devices continues at a rapid pace. The wireless communication market now supports not just mobile handsets, but also mobile and fixed wireless broadband access devices, wireless local area network equipment, laptop computers, personal digital assistants, smart phones, tablet computers, wireless routers, wireless network attached storage devices and a seemingly endless array of applications.

Wireless networks have traditionally relied on a paid subscriber model where each individual user must pay for access to the network in some fashion. Historically this had been done on a month to month subscription basis, it is increasingly popular especially in developing markets for users to opt for a prepaid model. That way, users can control the amount which they spend and service providers can assure that they will receive revenue in advance for its use.

It is also desirable for users to be able to use their devices outside their home network, such as when they are travelling. There are existing solutions for providing this functionality. International Patent Publication No. WO00/024161 entitled "Charging Method in Telecommunications Network" describes one approach applicable for a GPRS (General Packet Radio Service) packet data service that are provided over a Global System for Mobile (GSM) network. In these networks a Serving GPRS Support Node (SGSN) and a Gateway GPRS Support Node (GGSN) are connected via an intra-operator backbone network. The SGSN may be a gateway device located where the subscriber is, that is, in the roaming network, and the GGSN located at a gateway in the subscriber's home network. The approach described here implements a Camel Service Environment (CSE) in all of the various SGSNs and GGSNs, so that a billing unit can then be responsible for debiting a prepaid account on the basis of information it receives from the CSE-enabled gateways.

In another approach described in European Patent Application EP 1223737 entitled "Providing Prepaid Services to a GPRS Mobile Station when Roaming", it was recognized that the Camel Service Environment requires both the visited network and the home network to each support the same Camel level (for example, Camel Phase 3). In another approach described here, a prepaid service data maintaining node is operated under control of the home network service provider. The prepaid service data maintaining node provides the gateway nodes with information data and/or instructions concerning the prepaid data service operated by the home network, even when not all of the SGSN themselves participate in Camel.

International Patent Publication No. WO02/41592 entitled "Network Requested Packet Data Protocol Context Activation" describes a particular method for providing a Packet Data Protocol (PDP) context activation in a core network based on GSM to provide Third Generation Partnership Project (3GPP2) data services. The GGSN in this network maintains routing information for Packet Switched (PS) users. The routing information can be used to tunnel Protocol Data Unites to a Mobile Station's current point of attachment, i.e., the SGSN.

SUMMARY

I. Introduction to the Technical Problem and Solution

As different wireless technologies have evolved, such as GSM, Code Division Multiple Access (CDMA) and other air interfaces, so too have different protocols supporting prepaid deployment of data services. This has created a mesh of various protocols which limits the interworking between these wireless protocols and various networks. For end users it is therefore very difficult to obtain home-like prepaid data services while roaming in networks outside their home operator. The solution described herein provides a seamless experience to such end users while they roam on other networks.

Presented here is a technical solution to the technical problem of bridging the gap that now exists between intra-technology and inter-technology prepaid protocols for interworking wireless solutions. The solution is implemented as a hub based prepaid engine that interacts with various technologies and various prepaid protocols, and provides a strong platform to enable roaming for prepaid data in this complex environment.

Customer operators attach to the hub based prepaid engine and can interwork with their roaming partners (inter- or intra-technology) without changing anything in their respective networks or implementing new standalone solutions.

Since the traffic for real time services also passes through the hub based prepaid engine, the same hub can also provide capabilities to implement other intelligent applications and value added services.

This approach helps operators in following ways:

1. Provides larger footprint for prepaid data roaming for operators.

2. Saves capital expense and operating expense for the operators, while delivering a home prepaid data experience in foreign networks irrespective of the visited network's technology or protocol support for prepaid data.

3. Solves an industry problem to speed up prepaid data roaming at a much faster pace accommodating the technological differences in various network technologies.

4. Provides a platform to deliver intelligent/value added services.

III. Further Statement of the Technical Problem

For operators to generate more revenue and retain subscribers it becomes important to provide a home-like prepaid-data experience, even when the user is traveling in a foreign network (intra or inter technology roaming). This becomes difficult because every operator has a different interpretation and implementation of prepaid data attributes (based on technology, vendors, protocols etc.) There are various challenges faced by the operators to deploy prepaid data roaming in this way:

1. Finding a good prepaid data footprint so that roamers can utilize their home based prepaid charging engine and have seamless experience in roaming networks. This is further complicated if the operators want to offload the traffic in foreign networks (traffic not desired to tunnel back to home because of capacity issues). So there are two scenarios within this scenario:

a. Traffic tunneled back to home.

b. Traffic not tunnelled back to home.

2. Cost effective deployment of prepaid service in home and roaming environments. This becomes a challenge to control capital expense and operating expense with installing and maintaining various standalone prepaid data engines/servers.

3. Camel Phase 3 supports prepaid data in GSM but is actually deployed in very few networks. With deployment of prepaid roaming data/IP footprint for prepaid, roaming becomes limited because of limitations on the GSM Camel protocol (Limited to CAP V3, with only Version 3 having prepaid data support, which is itself deployed only in very few networks.

4. For inter technology roaming there are no standard ways to interwork between the different protocols across different technologies. This limits roll out of prepaid data services in inter-standard roaming scenarios. For example, 3GPP2 (CDMA) uses the PrePaid Client (PPC) (e.g., PPAC+PPAQ) and Authentication Authorization and Accounting (AAA) radius protocols to control interworking, while 3GPP systems use Diameter or Camel Phase 3 Protocols for prepaid data roaming.

IV. More Detailed Summary of the Technical Solution

In one embodiment, a prepaid data hub maintains pre-payment information for a number of different roaming wireless subscribers with the subscribers using different protocols and different technologies. The Prepaid Data Hub interacts with two or more wireless telecommunication systems networks. At least one of the networks is a home network for a specific subscriber mobile device and another network is a network in which the subscriber is roaming. The second network in which the subscriber is roaming is operated by a different operator than an operator of the first network.

The Prepaid Data Hub thus interfaces with at least a first operator network and at least a second operator network to retrieve pre-payment information using two or more different protocols. The pPrepaid Data Hub thus can control the maximum connection time and/or provide a limit on the amount of data consumed in a subscriber session, without the need for network gateways themselves to provide control over and/or maintain pre-payment information.

In an optional implementation, the Prepaid Data Hub may include or access hosted policy management information. The hosted policy management information may in other implementations be provided via communication with a home prepaid system.

In one implementation, a first network maybe a GSM based network that uses the Camel protocol and the second network may be a GSM or GPRS/LTE network that does not implement the Camel protocol.

In other implementations either the first or second network may be a GSM/GPRS/LTE network and the other network may be a 3GPP2 network that uses a PPC protocol.

In still other implementations, the first or second network maybe a 3GPP network using a Diameter or Camel phase 3 protocol for prepaid data roaming.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF EXAMPLE EMBODIMENTS

A description of example embodiments of the invention follows.

I. TERMS USED

The following is a list of definitions for some of the abbreviations used in this document:
GGSN: Gateway GPRS Support node
PGW: Packet Data Network Gateway
GTP: GPRS tunneling protocol
IN: Intelligent Network
OCS: Online Charging System
DPI: Deep Packet inspection
Camel: Customized Applications for Mobile Network Enhanced Logic
Camel V3: Customized Applications for Mobile Network Enhanced Logic version 3
PPC: Prepaid Client
AAA: Authentication Authorization and Accounting
3GPP: 3rd Generation Partnership Project
3GPP2: 3rd Generation Partnership Project 2
Wi-Max: Worldwide Interoperability for Microwave Access
Wi-Fi: Refers to 802.11 IEEE standards for Wlan
PGW Packet Data Gateway
SGSN Serving GPRS Support node

II. SYSTEM LEVEL DESCRIPTION OF PREPAID DATA HUB

Figure 1:
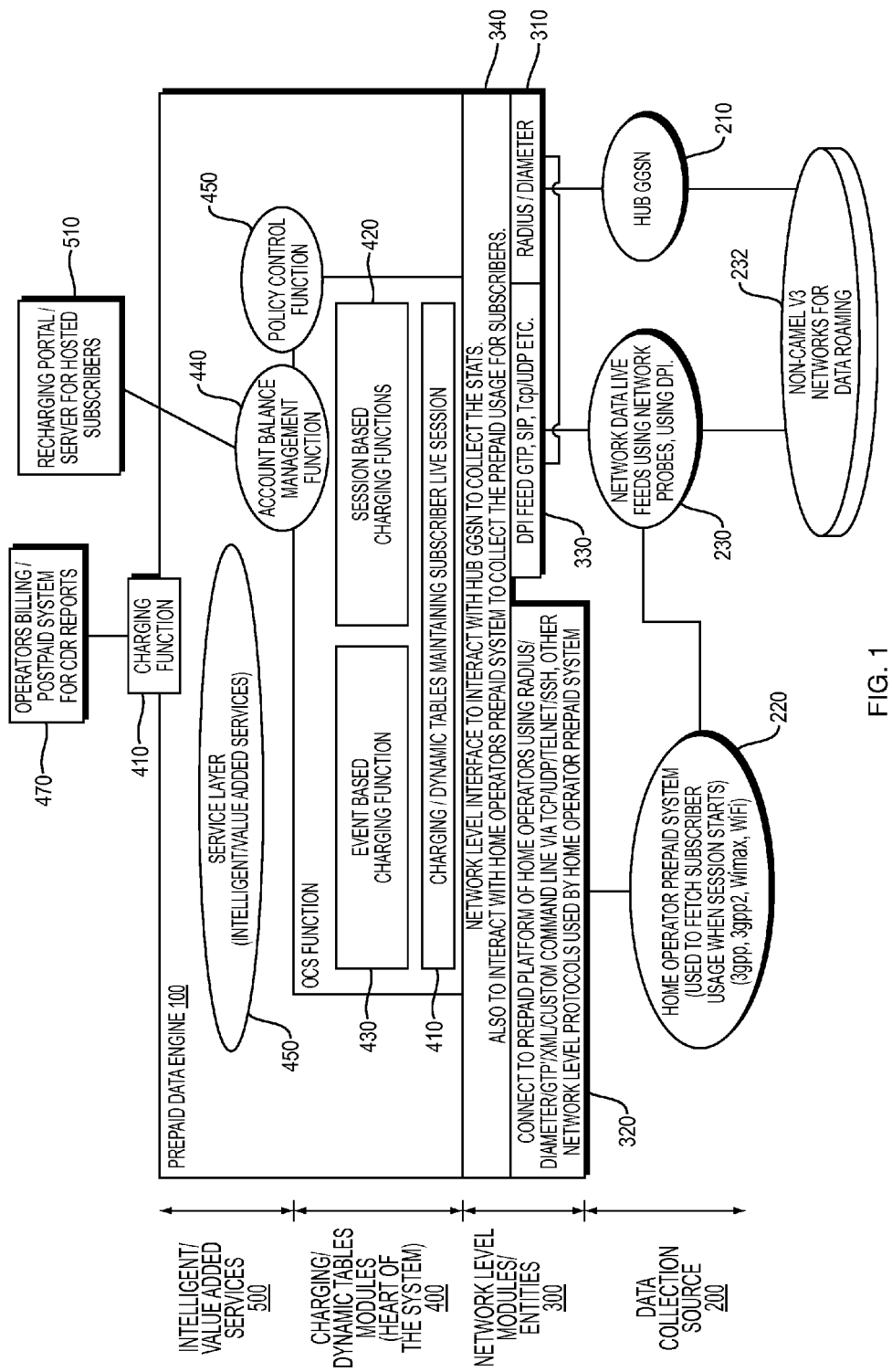
FIG. 1 is a system level diagram of a Prepaid Data Hub.

FIG. 1 is a block level diagram of a Prepaid Data Hub (also called an "engine" herein). The Prepaid Data Hub 100 contains three main modules:

Network Module 300: This module interacts with other systems using various protocols as required by different systems as in reference to the overall solution. It interacts with an NAS server (for example, a GGSN/PGW as depicted in the network diagram of FIG. 1), and with an operator home prepaid system (such as AAA, IN, OCS or other prepaid charging/billing system).

Dynamic Tables Module 400-1: This function creates and maintains live data usage for each session created by each subscriber. It interacts with the Network Module to collect and maintain usage information for subscriber sessions. It also interacts with the Charging Module to provide this information.

Charging Module 400-2: This function acts as a session controlling function. It interacts with the Network Module to fetch the credit for a session from the operator's home prepaid system or the hosted prepaid system. This provides an account balance and session management mechanism. It also interacts with the service layer to provide intelligent/value added services as described below.

As shown in FIG. 1, the Prepaid Data Hub 100 connects to various data collection sources 200. These may include a hub GGSN 210 as may be provided in a GPRS and/or 3G network such as LTE (Long Term Evolution) network. Other types of home operator prepaid systems 220 also provide messaging platforms to fetch subscriber usage information, such as for example, deployed in 3GPP, 3GPP2, Wi-Max, paid-for WiFi networks. These may access live network data feeds using network probes such as the DPI protocol, which may for example provide access to non-Camel compatible GSM networks 232. As a result, subscriber usage information can be fetched from various data collection sources 200 through appropriate network functionality within the single prepaid data engine 100.

A Radius/Diameter interface 310 interacts with the hub GGSN 210. In addition, another interface 320 uses Radius/Diameter/pxml/xml or other custom command line interfaces (using TCP, UDP, Telnet or other network level protocols) to access the home operator prepaid system 220. DPI feeds 330 provide an interface to other network live data feeds 230.

These network level modules 310, 320, 330 interact with a next layer interface 340 that hides the details of messaging and interaction with the different data collection sources 200 from the other higher layer functions such as dynamic tables 400 and intelligent value added services 500.

Within the dynamic tables module 400 are provided OCS functions including a charging dynamic table subscriber live session manager 410, session based charging function 420, event based charging function 430 as well as account balance management function 440 and optional policy control function 450.

The account balance management function 440 and/or policy control function 450 may further interface with external recharging/servers 510 for hosted subscribers. Finally a separate service layer 455 can provide intelligent or other value added services.

The charging function 410, which is a primary purpose of the charge and dynamic table module 400 can implement for example, session based charging functions 420 and event based charging functions 430. In order to accomplish this, the charging function 410 may further receive data from the operators billing/post-pay system CDR reports 470.

It is therefore now understood how a network level interface 340 can convert the different protocols used by the disparate prepaid data collection sources 200 to an internal set of commands, to then maintain a charging dynamic tables function for each prepaid subscriber session. Without such interfaces and functions it would not otherwise be possible for prepaid subscribers to roam out of their home networks or inter-technology, without the network operators themselves agreeing to implement a special protocol such as Camel. By keeping the prepaid solution "in middle" as does the prepaid hub 100, a subscriber can now, for example, maintain the same session as he roams. When the subscriber moves to a new network the prepaid hub 100 merely makes changes to the accounting data associated with the current session, without interrupting the session.

It should also be recognized that the Prepaid Data Hub 100, now being freed of wireless-network specific functionalities, is now fully implementable as a cloud based data processing service. As is known, such data processing functions can be implemented as an on-demand service delivered over a network connection to a shared virtualized data processing center having capacity that expands on demand. Such a cloud based implementation provides all of the advantages therein of access on demand, scalability, affordability, and deployment at minimal initial cost.

The Prepaid Data Hub 100 is implemented as a separate network node that maintains dynamic data usage information of the subscribers. Maintaining such dynamic information involves creating a session on a first attempt of the subscriber and then updating the usage information (e.g., data usage, time, and/or event) on subsequent messages until an end of session is achieved. This information is collected using diverse protocols such as Radius, Diameter, GTP' etc., and/or via a probe based setup where a network probe is setup to trap the usage, and is independent of the underlying operator's wireless protocols and any home network prepaid solution(s) they may implement.

The Dynamic Tables Modules 400 maintains the subscriber live usage information and act as the "prepaid client" for the hub. This module is the heart of the system, providing network connects and network level information to other modules of the system that make use of this information to make intelligent decisions.

Figure 2:
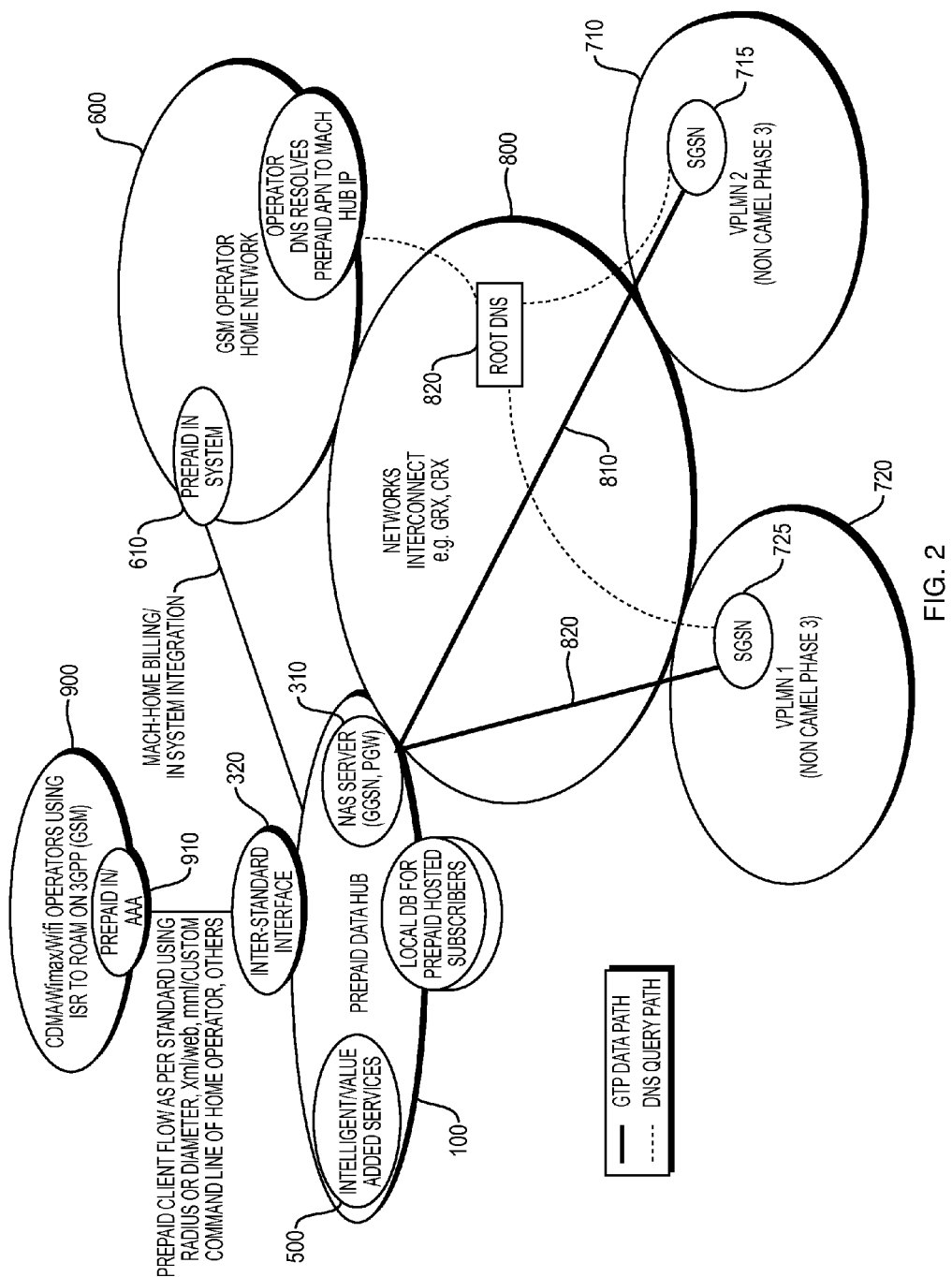
FIG. 2 is a network level diagram that illustrates how the Prepaid Data Hub interfaces with various networks.

FIG. 2 is a Network Level Diagram for a typical deployment for the Prepaid Data Hub 100 System shown in FIG. 1.

Here the Prepaid Data Hub 100 interfaces via a Network Access Server (NAS) server such as a GGSN or PGW to an intelligent network interconnect 800, such as may be provided by a GSM Roaming Exchange (GRX), CDMA Roaming Exchange (CRX) or other similar roaming interchange. The roaming interchange 800 provides tunnels 810, 820 for traffic to be carried through one or more Virtual Private Land Mobile Networks VPLMNs 710, 720 having respective SGSNs 715, 725. The associated subscriber also has a home network 600. In this example for GSM/GPRS/LTE operation, the prepaid intelligent network system 610 communicates directly with the Prepaid Data Hub 100 at its respective radius/diameter interface 310. As a subscriber roams to a visited network, an operator DNS service resolves any prepaid access point node request and then matching the IP address of the Prepaid Data Hub 100. In this manner, access requests originating at SSGNs 715, 725 are passed through the root DNS 320 through tunnels to Prepaid Data Hub 100.

Examples of intelligent services implemented by the Prepaid Data Hub 100 may include a credit portal where a subscriber may login and have access to increase his amount of available credit, irrespective of his home operator.

More specifically, a subscribers wireless sessions are then controlled based on usage as follows. At the time of start, the Charging Module 410 in the Prepaid Data Hub 100 downloads the actual credit for that subscriber either from credit portal 500 or from the subscriber home prepaid system 610. Access is then provided if subscriber has enough credit available. The Credit Portal 610 is a hosted online charging system which hosts the subscriber credentials for one or more operators that do not have their own systems. The subscriber's home prepaid system 600 can be any IN, OCS, or other online billing/charging systems that hold information for subscriber's available usage and other related parameters.

After the sessions are created and subscriber credit is downloaded, the Charging Module 400 keeps track of user credit in dynamic tables 410 and stops the session automatically when the credit is exhausted. There is a period where notification to subscriber should preferably be given for low balance so that he can recharge. The notification maybe by SMS message or email for example. This function is implemented by keeping some fixed number between the credit available and dynamic subscriber usage information, e.g., a buffer zone.

The above defined functions together act as a credit control system that is the heart of the complete Prepaid Data Hub 100.

In the Network Module 300, the information feed is provided by a Server/DPI Modules 330 that collect the dynamic information from a GGSN/network feed 230. The Network Module 300 also provides an interface to the home operator's prepaid system 610 to download the credit/usage at the start of any session. This interface supports multiple ways to interact with the home prepaid system 600 depending on which technology/protocols they support. This enables the function of inter-standard or intra standard prepaid roaming.

The system also provides functionality to enforce a policy based on home profile for the subscriber. Policy based profile selection/enforcement can be supported by the system wherever applicable/supported by home operator. For example, a policy may allow only certain uses for roaming subscribers, such as SMS only, email only, iPhone applications only, limits on browser access, and other subscriber access policies. One implementation of this is described in further detail below.

III. NETWORK CONNECTIVITY AND DATA FLOW DESCRIPTION

Case: Subscriber roaming in 3GPP systems network

Figure 3:
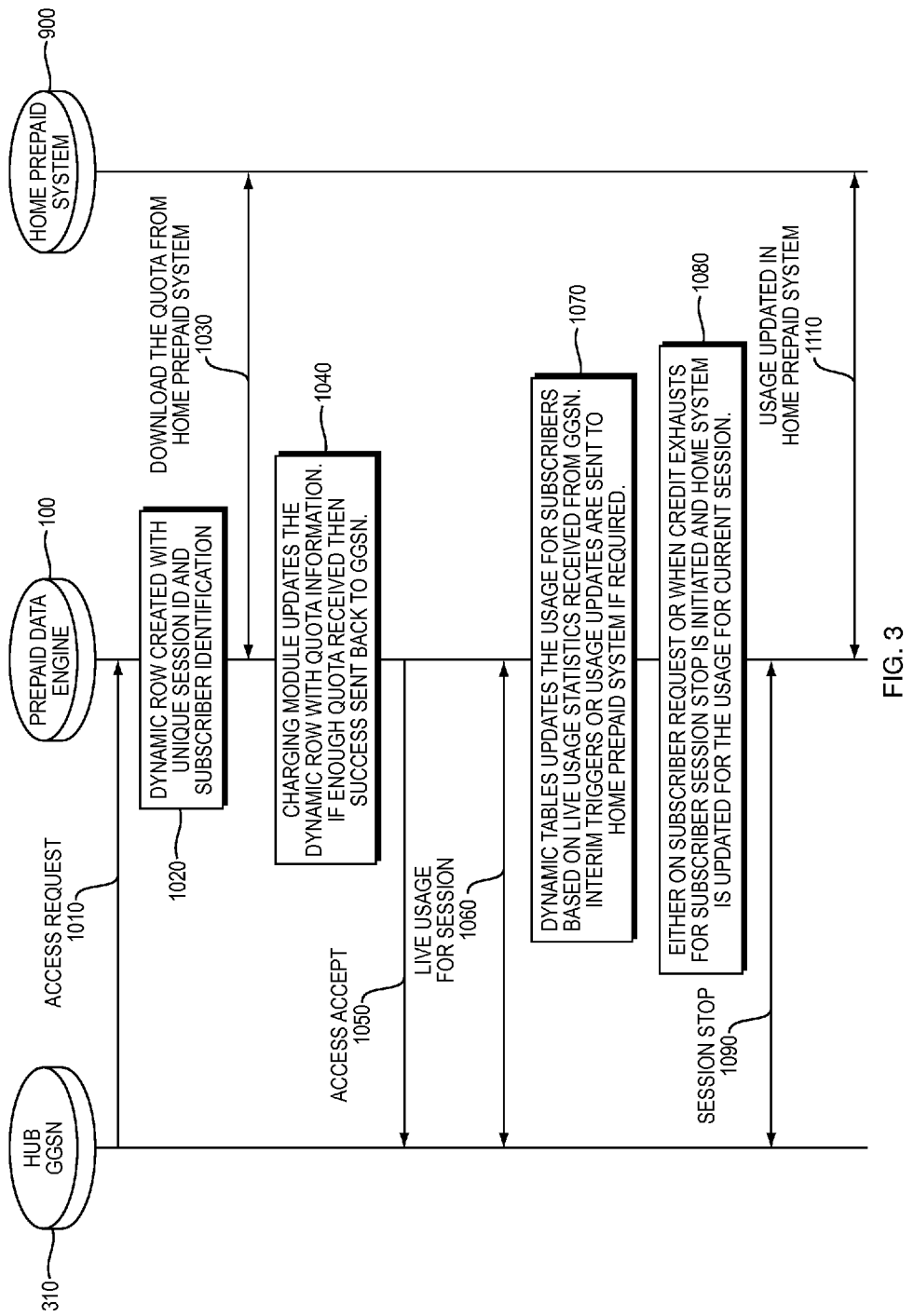
FIG. 3 is a high level protocol diagram showing one example of a call flow for the Prepaid Data Hub in a 3GPP system.

FIG. 3 is an example call flow for this case.

In this mode the Prepaid Data Hub 100 resides "behind" the GGSN (or PGW) that acts as the gateway to mobile user's data sessions. The GGSN is connected to the roaming partner's network and interacts with visited networks SGSN (not shown).

While roaming, the subscriber's sends a "GTP create pdp request" is resolved to the hub GGSN. This is forwarded as an Access Request to the Prepaid Data Hub 100 (Step 1010). The Hub GGSN 310 then interacts with the Prepaid Data Hub 100 through the network interface protocol to authorize the subscriber via a message to the Home Portal.

At this point the Prepaid Data Hub 100 creates a dynamic record (Step 1020) with a unique subscriber ID and downloads the credit/usage information (Step 1030) from the operator home network 900 using a protocol supported by the home operator (e.g., Radius, Diameter, XML/Web, MML/Custom Commands, Telnet, TCP/IP, SDP, etc), or from the Credit Portal 510.

If subscriber has enough credit then a successful accept is given back to GGSN (Step 1050) (else it is rejected).

On a successful accept, the GTP response is success and an IP address is assigned to the mobile device (not shown).

The GGSN then receives the packets from that assigned IP and reports the usage to the Prepaid Data Hub (Step 1060).

This usage reported by the GGSN is accumulated for the user (Step 1070) in the dynamic tables that were created at the start of the session. The credit control module keeps comparing the current usage to the allocated quota (Step 1080, as already downloaded from operator home prepaid system 900 of the subscriber).

As the quota exhausts, the system generates a stop session request (Step 1090) to GGSN (310) and also updates the home prepaid system 900 with used quota for this session (Step 1110). The GGSN (310) at this point terminates the session; also the home prepaid system also records and updates the usage for that session.

A stop can also be requested by the user in which a "GTP delete pdp ctx" message will be sent from the associated SGSN to the GGSN 310. The GGSN 310, upon receiving the message, sends a stop request to the Prepaid Data Hub 100 and the current usage is then updated in the home prepaid system 900 to reflect the correct usage for that particular session.

Other Cases:

Other cases like the above where this solution works include subscriber roaming in Wi-Fi, Wi-Max or 3GPP2 systems. The call flows and protocols are as supported by the technology but functionality for the system remains the same.

Another case is when the usage statistics are not collected from an NAS directly 310. This solution can instead use network probes to collect the network usage statistics and control the session. These probes can be installed in the operator's network wherever the traffic is offloaded.

Figure 4:
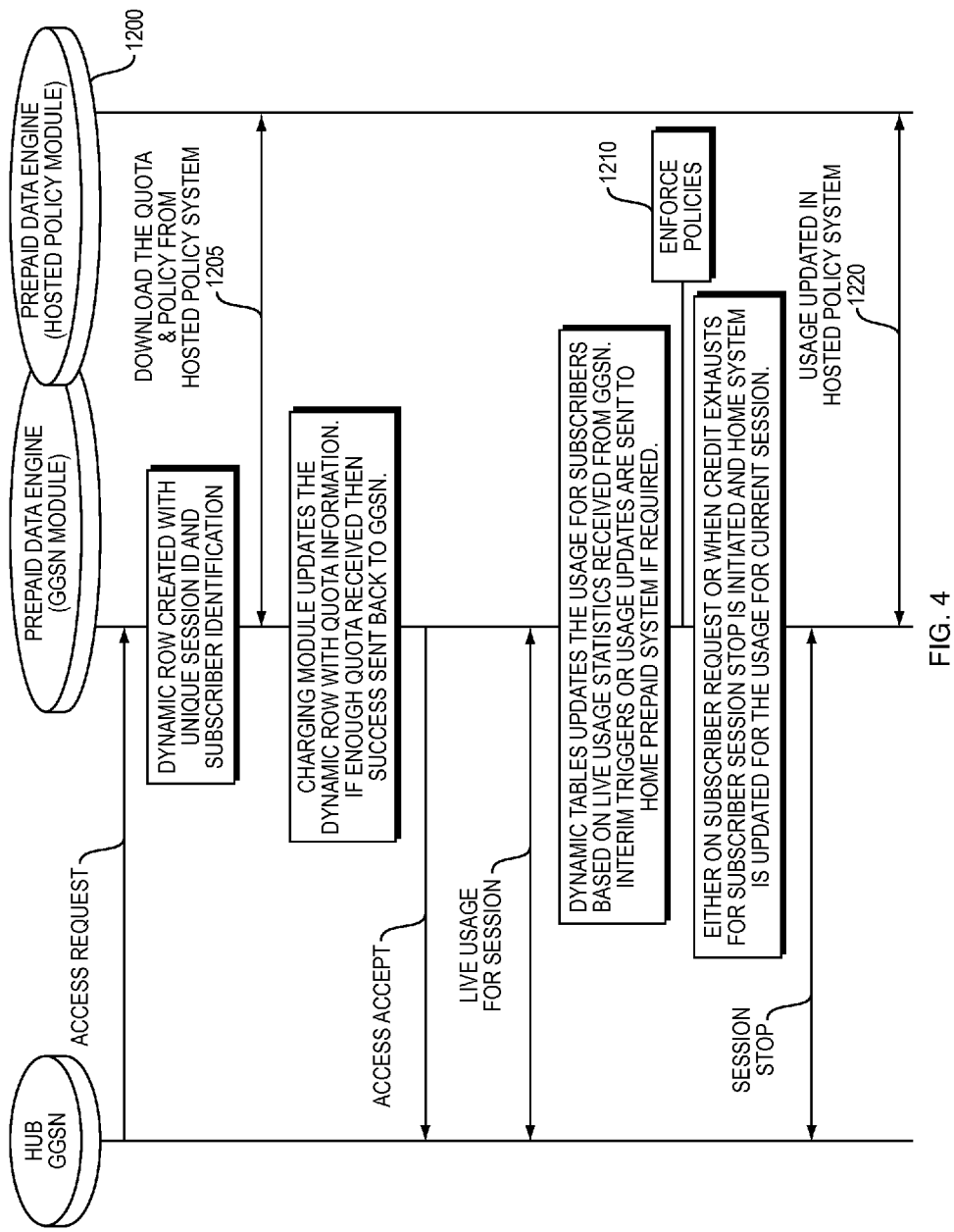
FIG. 4 is another example call flow.

FIG. 4 illustrates an arrangement where the Prepaid Data Hub 100 itself hots access policies; it should be understood that these may be treated in a separate node 1200. Here the policy information is downloaded in a Step 1205 upon session start, enforced during the session (such as at Step 1210) and uploaded at the end of a session as may be needed (Step 1220).

IV. CONCLUSION

This proposed solution provides a unique way of providing prepaid data to operators without requiring prepaid support in visited networks.

It provides unique ways to collect the network usage stats in a Hub base mode, and then, based on the information collected, interact with home prepaid systems to simulate a visited prepaid network.

It provides a unique way to support prepaid data interworking between different technologies with by converting the different protocols of prepaid supported across various technologies. It provides interworking prepaid data protocols between 3GPP to 3GPP2, 3GPP to Wi-Max, 3GPP to Wi-Fi. (Here 3GPP refers to GSM technologies like GP, EDGE, UMTS, HSPA and LTE.) This solution offers operators with an opportunity to quickly rollout their prepaid services outside their home network in a cost effective way. For end users they will have a home like experience while roaming on other networks and provide continuity.

While this invention has been particularly shown and described with references to example embodiments thereof, it will be understood by those skilled in the art that various changes in form and details may be made therein without departing from the scope of the invention encompassed by the appended claims.

What is claimed is:

1. A Prepaid Data Hub apparatus for controlling access to a wireless communication service comprising:

a first communication interface to a first gateway associated with a first wireless network, the first wireless network being a home network for a subscriber mobile device, the home network operated by a home network entity;

a second communication interface to a second gateway associated with a second wireless network, the second wireless network operated by an entity different from the home network entity operating the first wireless network; and a Charging Module for controlling, independently of the first and second gateways, access to the first and second wireless networks by the subscriber, the Charging Module being configured to:

download or maintain prepaid account balance information associated with the subscriber;

manage access to the first or second wireless network based on the prepaid account balance information; and maintain a quota for allowed prepaid data utilization for a plurality of subscribers, wherein the Prepaid Data Hub apparatus is a network node intermediate between the first and second wireless networks; and wherein functionalities of the Prepaid Data Hub apparatus include at least one structure that enables the Prepaid Data Hub to be implemented as a service delivered over a network connection to a shared virtualized data processing center, the structure including at least one of the Charging Module, a Network Module, and a Dynamic Tables Module.

2. The apparatus of claim 1 wherein the shared virtualized data processing center has capacity that expands on demand.

3. The apparatus of claim 1 wherein at least one interface is an interface to a Gateway GPRS support node (GGSN) or PGW.

4. The apparatus of claim 3 wherein the first and second wireless networks implement different prepaid technologies.

5. The apparatus of claim 4 wherein at least one of the prepaid technologies includes a prepaid portal operated independently of an associated operator entity.

6. The apparatus of claim 1 wherein the Charging Module is further configured to:
update data usage for the subscribers independent of operation of at least one of the first and second wireless networks.

7. The apparatus of claim 6 wherein the Charging Module is additionally configured to dynamically update a live utilization table entry for a plurality of subscribers.

8. The apparatus of claim 1 wherein a wireless technology used in the first wireless network is not the same as a wireless technology used in the second wireless network in which the subscriber is roaming.

9. The apparatus of claim 1 wherein the Charging Module is further configured to:
upon start of a subscriber session, obtain available credit information for the subscriber from a credit portal or from a home network prepaid system associated with the subscriber, depending upon a subscriber status.

10. The apparatus of claim 8 wherein the Charging Module is further configured to maintain information concerning network utilization for the subscriber in a session table.

11. The apparatus of claim 9 wherein the Charging Module is further configured to notify the subscriber via SMS or email when a prepaid balance is low.

12. The apparatus of claim 1 wherein the Prepaid Data Hub further comprises:
an interface to a Roaming Exchange, for receiving subscriber traffic tunneled from the subscriber device when the subscriber is roaming away from the home network.

13. The apparatus of claim 1 additionally comprising:
a Policy Control Module, for receiving subscriber traffic policy information from a policy server, and implementing such policy information on subscriber data traffic.

14. The apparatus of claim 1 wherein in managing access to the first and second wireless networks, the Charging Module is further configured to apply session based charging and event based charging.

15. The apparatus of claim 1 wherein at least one of the first and second wireless networks is Wi-Fi system or a Wi-Max system.

16. The apparatus of claim 5 wherein the associated operator entity includes the home network entity.

17. The apparatus of claim 1 wherein the home network and the first gateway are operated by the home network entity and the second wireless network and the second gateway are operated by the entity that is different from the home network entity.

18. The apparatus of claim 8 wherein roaming includes inter-standard and intra-standard pre-paid roaming.

* * * * *